(12) United States Patent
Yoo et al.

(10) Patent No.: US 7,299,987 B2
(45) Date of Patent: Nov. 27, 2007

(54) PORTABLE HANDSET HAVING A RADIO FREQUENCY IDENTIFICATION(RFID) FUNCTION AND METHOD USING THE SAME

(75) Inventors: Jeong-joon Yoo, Incheon (KR); Jong-hwa Won, Suwon-si (KR); Woo-shik Kang, Suwon-si (KR); Dong-hyun Lee, Suwon-si (KR); Ja-nam Ku, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 11/011,030

(22) Filed: Dec. 15, 2004

(65) Prior Publication Data

US 2005/0127156 A1 Jun. 16, 2005

(30) Foreign Application Priority Data

Dec. 15, 2003 (KR) .................. 10-2003-0091530

(51) Int. Cl.
*G06K 7/10* (2006.01)
(52) U.S. Cl. ..................... 235/472.01; 235/472.02; 235/472.03; 235/375
(58) Field of Classification Search .......... 235/472.01, 235/472.02, 472.03, 375
See application file for complete search history.

(56) References Cited

U.S. PATENT DOCUMENTS 6,913,199 B2* 7/2005 He ........................ 235/454
2003/0120745 A1 6/2003 Katagishi et al.

FOREIGN PATENT DOCUMENTS

| EP | 1 087 319 A2 | 3/2001 |
| EP | 1 244 043 A2 | 9/2002 |
| JP | 2000-278762 A | 10/2000 |
| JP | 2002-324021 A | 11/2002 |
| JP | 2003-157477 A | 5/2003 |
| JP | 2003-198451 A | 7/2003 |
| KR | 2003-0089683 A | 11/2003 |
| WO | WO 99/17230 A1 | 4/1999 |

* cited by examiner

*Primary Examiner*—Karl D. Frech
(74) *Attorney, Agent, or Firm*—Sughrue Mion Pllc

(57) ABSTRACT

In receiving information on an item by use of electromagnetic waves propagating from the item in which a radio frequency identification (RFID) chip is embedded, a portable handset requests the information on the item that is stored in the RFID chip to the RFID chip-embedded item, receives from the item the information on the item, and, if additional information is needed other than the received information, requests the additional information to a server storing the information on the item by using the received information.

26 Claims, 5 Drawing Sheets

PORTABLE HANDSET HAVING A RADIO FREQUENCY IDENTIFICATION(RFID) FUNCTION AND METHOD USING THE SAME

This application claims priority benefit under 35 U.S.C. § 119 from Korean Patent Application No. 2003-91530, filed on Dec. 15, 2003, the entire content of which is incorporated herein by reference.

BACKGROUND OF THE INVENTION

1. Field of the Invention

The present invention relates to a portable handset, and more particularly to a method for acquiring necessary information by using the portable handset.

2. Description of the Related Art

Together with the developments of communications technologies, portable handsets have been developed. The portable handsets acquire information stored in a specific server in addition to communications with different portable handsets. However, diverse additional functions have been developed to meet the needs of users using the portable handsets. Hereinafter, description will be made on a general structure of the portable handsets, and then description will be made on various additional functions of the portable handsets.

FIG. 1 is a view for showing a structure of a signal reception part of a general portable handset. Hereinafter, description will be made in detail on a structure of a signal reception part of the portable handset with reference to FIG. 1. An antenna 100 receives electromagnetic wave signals in the air, and then sends the signals to a band select filter (RSF) 102. The signals received by the antenna 100 has a signal that a user wants but includes other signals, so the band select filter 102 applies the bandpass filtering to enable only a user-desired frequency band to be amplified. In case plural wireless channels are used, it is necessary to pass the plural wireless channels, and, in case the same antenna is used, a duplexer performs the function of the band select filter 102.

A low noise amplifier (LNA) 104 prevents noise included in the received signal from being amplified, as well as amplifies the received signal. An image reject filter (IRF) 106 applies the bandpass filtering again not to send to a mixer an image that has to be removed out of the received signal amplified in the low noise amplifier 104. The received signal to which the bandpass filtering has been applied in the image reject filter 106 is sent to an RF down mixer 108.

An RF local oscillator 110 supplies a signal having an LO frequency to the RF down mixer 108 to mix frequencies. If a channel is necessarily selected, the channel can be selected as the LO frequency varies. A phase-locked loop (PLL) 112 fixes an output frequency of the RF local oscillator 110 to a certain frequency to prevent the output frequency from varying. The RF down mixer 108 uses the output frequency of the RF local oscillator 110 to convert an RF signal received from the image reject filter 106 into a frequency of an intermediate frequency (IF) band.

A channel select filter (CSF) 114 performs a function of applying the bandpass filtering to the IF frequency-converted signal to select only a desired channel. The channel select filter 114 has short intervals between channels, so it needs an excellent performance. An IF amplifier (IFA) 116 amplifies a filtered signal of a selected channel. The signal amplified in the IF amplifier 116 is sent to an IF down mixer 118. An IF local oscillator 120 sends an LO frequency to the IF down mixer 118 in order to convert the IF signal to a baseband signal. The phase-locked loop may be used to lock the LO frequency. The IF down mixer 118 uses the LO frequency to convert a signal of the IF band to a baseband signal, and outputs the converted baseband signal.

FIG. 2 is a view for showing a structure of a signal transmission part of a portable handset. Hereinafter, description will be made on a structure of a signal transmission part of the portable handset according to an embodiment of the present invention with reference to FIG. 2. The structure of the signal transmission part of the portable handset of FIG. 2 is similar to the structure of the signal reception part of the portable handset of FIG. 1. Thus, the description will be skipped when the structure is the same as that of the signal reception part of the portable handset.

The units from IF down mixer 200 to the image reject filter 214 operate reverse to the operations carried out in the units from the IF down mixer 118 to the image reject filter 106 that are shown in FIG. 1. Hereinafter, description will be made on the drive amplifier (DA) 216. The signal transmission part has a certain input signal unlike the signal reception part. The drive amplifier 216 solves the problem of the insufficient gain of the power amplifier 220, and performs a function of generating enough input power to the power amplifier 220. The band select filter 218 performs a function of removing unnecessary frequency output components out of the signals outputted from the drive amplifier 216. The power amplifier 220 amplifies power so that a signal having enough power at the final stage can be wirelessly transmitted. The isolator 222 performs a function of setting a signal direction in order for a signal to be sent in a specific direction. That is, the isolator 222 carries out a function of passing a signal in an output direction and removing a signal coming in a reverse direction. Thus, the signal coming in the reverse direction through the antenna 226 is removed. The band select filter 224 carries out the same function as the band select filter 102. That is, the band select filter 224 applies the last bandpass filtering in order to wirelessly pass only a desired frequency band. The transmission signal to which the bandpass filtering is applied is transmitted wirelessly through the antenna 226.

Hereinafter, description will be made on the radio frequency identification (RFID) that is used in various devices or units including portable handsets. The RFID technology has been developed to cope with the changed production method, changed consumer trends, advanced culture and technologies, and necessity of overcoming drawbacks of bar codes and magnetic cards. The RFID is a kind of contactless card, and contactless cards are generally referred to as RFID.

The RFID is characterized in that it does not need time for a user to insert it into readers, undergoes no friction or damage due to having no mechanical contacts, and has less pollution or environment influence. The antenna is continuously transmitting electromagnetic waves, and, if a card (TAG) in which ID and data are stored is in a range of the electromagnetic waves, the card sends to the antenna the ID and data the card itself holds. The antenna converts into a data signal the ID sent from the card, and sends the data signal to a personal computer (PC), and the personal computer performs a comparison with a database (DB) that has been stored, and provides desired services. Signal frequencies used at this time range from 10 kHz to 300 GHz, but a low frequency of 134.2 kHz is primarily used. Hereinafter, description will be made on the features of the RFID.

First, the RFID can recognize plural cards at the same time and at a high speed, to thereby saving time. Due to the above advantages, the RFID tag is replacing the bar code or the magnetic strip in the logistics field. Second, since the RFID has a long sensing distance, the RFID can be easily and widely applied depending on the system characteristics and peripheral environments. The RFID is also replacing the contact smart cards used for existing parking control systems. Third, the RFID has an excellent environment resistance, so it has a long life span. Since users do not have to insert the card into a reader and the card has no mechanical contact, the RFID has a very low error rate even under bad conditions such as card (TAG) damages due to friction, dust, humidity, temperature, snowfall, rainfall, and so on. Thus, the RFID is often applied to a system in an open area. Fourth, the RFID can pass through non-metal materials. Fifth, the RFID can recognize an object moving at a high speed. Since the time it takes from electric wave transmissions of the antenna to ID recognition is merely 0.01~0.1 seconds, the RFID can be installed in and applied to a non-stop parking control system and automatic fare collection systems at non-stop highways or tunnels. Thanks to the above advantages, the RFID technology is being applied even to portable handsets, so diverse RFID technology application methods are being discussed.

SUMMARY OF THE INVENTION

The present invention has been developed in order to solve the above drawbacks and other problems associated with the conventional arrangement. An exemplary aspect of the present invention is to provide a system and method capable of diversely applying the existing RFID technology to portable handsets.

Another exemplary aspect of the present invention is to provide a system and method enabling users of portable handsets to easily obtain their necessary information at any time by use of the RFID technology.

Yet another exemplary aspect of the present invention is to provide a system and method enabling electronic commerce to be implemented by use of the information that the users of the portable handsets obtain by using the RFID technology.

The foregoing and other objects and advantages are substantially realized by providing a method for receiving information on an item by use of electromagnetic waves propagating from the item in which a radio frequency identification (RFID) chip is embedded, comprising the steps of requesting by a portable handset the information on the item that is stored in the RFID chip to the RFID chip-embedded item; receiving from the item the information on the item, and, if additional information is needed other than the received information, requesting the additional information to a server storing the information on the item by the portable handset using the received information.

The foregoing and other objects and advantages are substantially realized by providing a system for receiving information on an item by use of electromagnetic waves propagating from the item in which a radio frequency identification (RFID) chip is embedded, comprising a portable handset for requesting to the RFID chip-embedded item information the RFID chip stores, receiving the requested information, and, if additional information is needed other than the received information, requesting the additional information to a server storing the information on the item, using the received information; and the RFID chip for sending the information stored therein upon the requests.

BRIEF DESCRIPTION OF THE DRAWINGS

The above exemplary aspects and features of the present invention will be more apparent by describing certain exemplary embodiments of the present invention with reference to the accompanying drawings, in which.

BRIEF DESCRIPTION OF EXEMPLARY EMBODIMENTS

Figure 1:
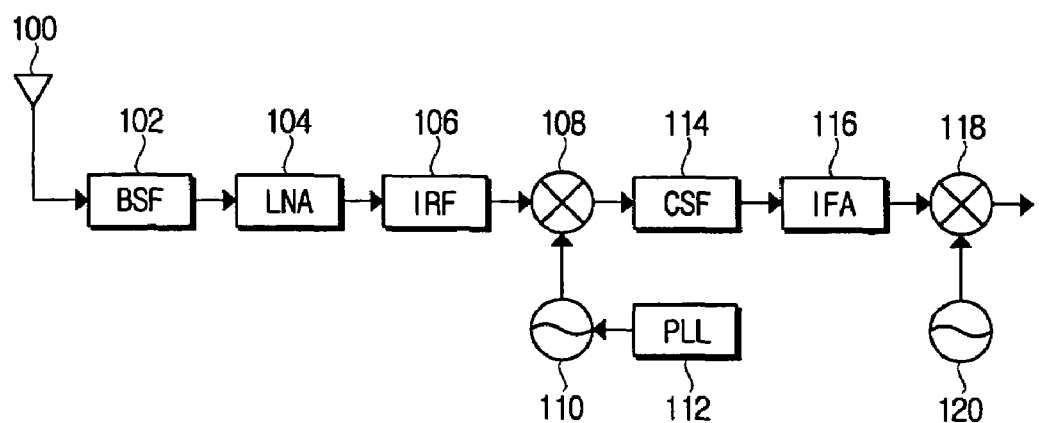
FIG. 1 is a view for showing a structure of a signal reception part of a portable handset.

Certain exemplary embodiments of the present invention will be described in greater detail with reference to the accompanying drawings.

In the following description, same drawing reference numerals are used for the same elements even in different drawings. The matters defined in the description such as detailed construction and elements are provided only to assist in a comprehensive understanding of the invention. Thus, it is apparent that the present invention can be carried out without those defined matters.

Also, well-known functions or constructions are not described in detail since they would obscure the invention in unnecessary detail.

Figure 3:
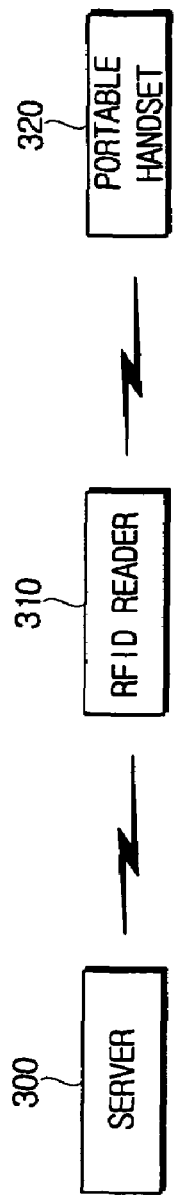
FIG. 3 is a view for showing a portable handset serving as an RFID transponder according to an exemplary embodiment of the present invention.

The existing portable handset is used as an RFID transponder, but the portable handset according to an exemplary embodiment of the present invention has a function for an RFID reader, in addition to a function for the RFID transponder. Hereinafter, description will be made on the portable handset performing a function for the RFID transponder and a function for the RFID reader. FIG. 3 shows the portable handset performing a function for the RFID transponder.

In FIG. 3, the portable handset has a server 300, a portable handset 320 as an RFID transponder, and an RFID reader 310. Hereinafter, description will be made on the portable handset as an RFID transponder with reference to FIG. 3.

The RFID reader 310 continuously generates electromagnetic waves through the antenna. If the portable handset 320 enters a range in which it can receive the electromagnetic waves propagated from the RFID reader 310, the portable handset 320 receives the electromagnetic waves generated from the RFID reader 310. In order that the portable handset 320 receives the electromagnetic waves generated from the RFID reader 310, the portable handset 320 is provided with a function for receiving the electromagnetic waves. Description will be later made on a structure for the portable handset 320 to receive the electromagnetic waves generated from the RFID reader 310.

If the portable handset 320 receives the electromagnetic waves of the RFID reader 310, the portable handset 320 sends response information with respect to the received information. For example, in case that the bus fare is paid by the portable handset 320, the RFID reader 310 installed in a bus makes an enquiry about whether the bus fare can be paid by the portable handset 320. The portable handset 320 having received the enquiry checks the amount of money or balance available for payment (the balance stored therein), and checks if the balance is more than the bus fare. If the balance is checked to be more than the bus fare, the portable handset 320 notifies that it can pay the bus fare, deducts the bus fare from the checked balance, and stores a new balance. The RFID reader 310 processes information received from the portable handset 320. In the above circumstance, the portable handset 320 holds therein information corresponding to a certain amount of money.

However, in case of the current post-paid fare settlement system, the portable handset 320 can send its own information to the RFID reader 310. That is, the portable handset 320 can send the information of its unique number or user. The RFID reader 310, which has received the information of the unique number and user of the portable handset 320, sends the information to the server 300. The server 300 accumulates and stores the received information of the bus fares that the user of the portable handset 320 has to pay, using the received information. The accumulated bus fares are notified to the user of the portable handset 320 every period of time.

Figure 4:
FIG. 4 is a view for showing a portable handset serving as an RFID reader according to an exemplary embodiment of the present invention.

FIG. 4 is a view for showing a portable handset serving as an RFID reader according to an exemplary embodiment of the present invention. FIG. 4 shows a server 400, a portable handset 410, and an RFID transponder 420. Hereinafter, description will be made in detail on the portable handset serving as the RFID reader with reference to FIG. 4.

The portable handset 410 generates electromagnetic waves for the RFID according to the user's setting. In general, the portable handset 410 communicates with other portable handsets, or requests communications to a base station in order to read out data stored in the server 400. According to the user's setting, the portable handset 410 stops operations for communications with other portable handsets or for reading out data stored in the server 400, and serves only as the RFID reader. The portable handset 410 can perform operations for communications with other portable handsets or for reading out data stored in the server, and, at the same time, serve as the RFID reader.

The RFID transponder 420, which has received the electromagnetic waves propagated from the portable handset 410, sends its stored information to the portable handset 410. The portable handset 410 that has received the information sent by the RFID transponder 420 can display the information on the display unit of the portable handset 410, or store the information in the storage unit of the portable handset 410. The stored information can be read out at any time upon requests of a user of the portable handset 410. If the user of the portable handset 410 needs information other than the information displayed on the display unit, the user can request the necessary information to the server 400 that stores the information. Description will be made on operations performed between the portable handset 410 and the server 400.

If the RFID transponder 420 is a business card in which an RFID chip is embedded, the RFID transponder 420 sends information contained in the business card. The information contained in the business card may be a name, telephone numbers, business name, e-mail address, corporation homepage, and so on. If the user of the portable handset 410 that has received the information needs more information on the corporation in addition to the received information, the user requests necessary information to the server 400. The server 400 stores the business card and information on the business card. The server 400 sends to the portable handset 410 the stored information on the corporation upon the requests of the portable handset 410. Further, the portable handset 410 can connect to the corporation homepage contained in information it has received. Furthermore, the portable handset 410 can request communications at the received telephone numbers.

If the RFID transponder 420 is a post in which the RFID chip is embedded, the RFID transponder 420 sends the information contained in the post. The information contained in the post may be movie titles, leading actors and actresses, release dates, and so on. If the user of the portable handset 410 which has received the information needs information other than the received information, the user requests necessary information to the server 400. The server 400 stores the post and the information on the post. The server 400 sends to the portable handset 410 the stored information on the post in response to the request of the portable handset 410. Further, the portable handset 410 can acquire necessary information through connections to the server 400. The information that can be stored in the server 400 may be information necessary for the user to understand the content of the movie, such as a preview of the movie, production processes, and so on.

If the RFID transponder 420 is an item in which the RFID chip is embedded, the RFID transponder 420 sends information on the item. The information on the item may be a production place, producer, price, valid period of time, and so on, of the item. If the user of the portable handset 410 that has received the information needs more information other than the received information, the user requests necessary information to the server 400. The server 400 stores the information on the item. The server 400 sends to the portable handset 410 the stored information on the item upon requests of the portable handset 410. Further, the portable handset 410 can obtain necessary information through connections to the server 400. The information that can be stored in the server 400 may be producer's greetings, moving pictures for showing a cultivation process, distribution paths, and so on.

Hereinafter, description will be made on a structure for signal receptions and transmissions of the portable handset having the RFID reader. The structure for signal receptions and transmissions of the portable handset may vary depending upon the frequency used for the RFID reader and the frequency used for mobile communications. If the frequency used for the RFID reader is identical to the frequency used for the mobile communications, the existing structure for signal receptions and transmissions can be used. If the frequency used for the RFID reader is not identical to the frequency used for the mobile communications, the existing structure for signal receptions and transmissions can be modified for use. Further, a structure serving as the RFID reader can be separately provided. First, description will be made on the case in which the frequency used for the RFID reader is identical to the frequency used for the mobile communications and the existing structure is used.

Figure 5:
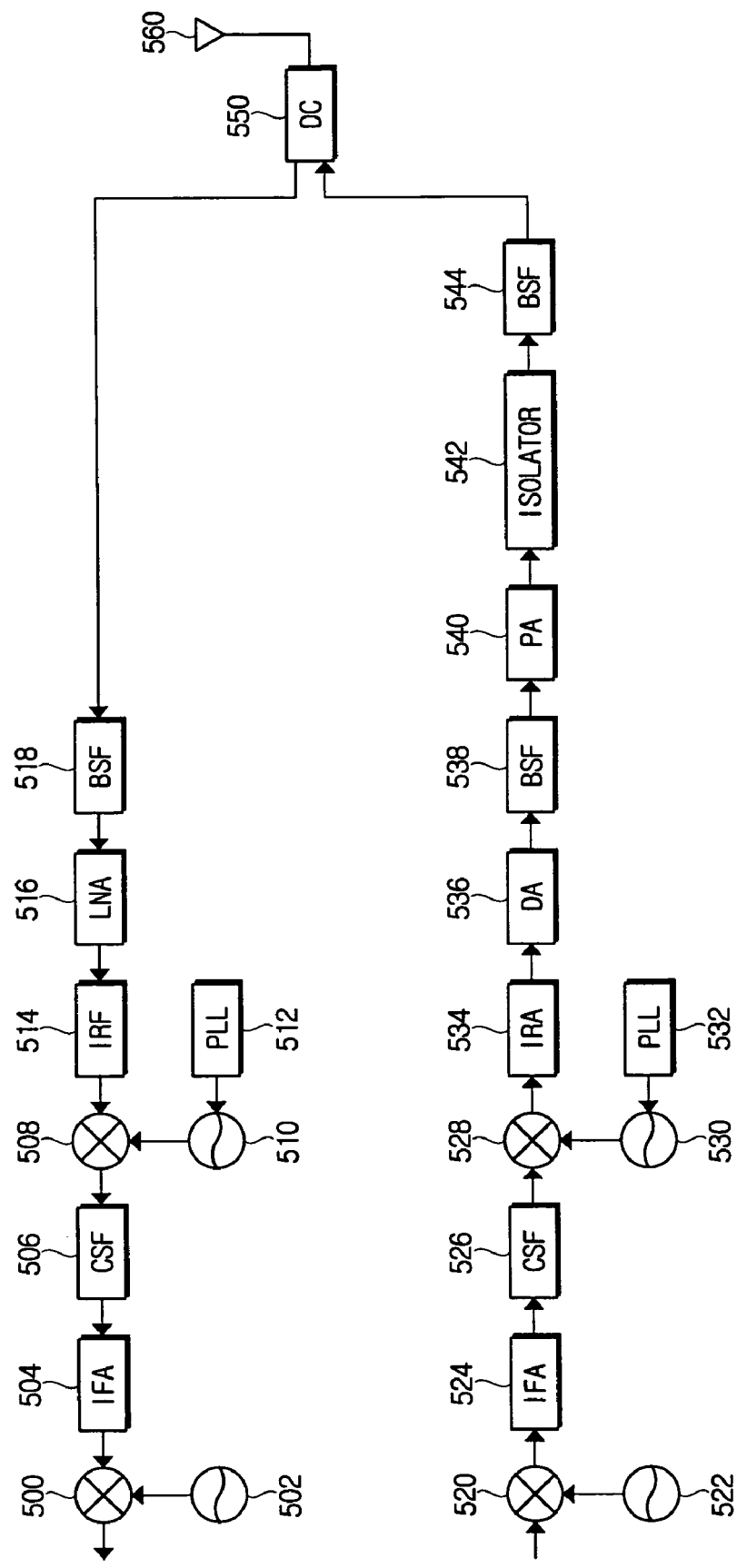
FIG. 5 is a view for showing a signal reception/transmission part of a portable handset according to an exemplary embodiment of the present invention.

FIG. 5 is a view for showing a structure for signal reception/transmission part of a portable handset having the RFID reader according to an exemplary embodiment of the present invention. As shown in FIG. 5, the portable handset has a signal transmission part and a signal reception part. The signal transmission part performs a function of the RFID reader and the existing function for mobile communications, at the same time. The signal reception part also performs the function of the RFID reader and the existing function for mobile communications, at the same time.

The user of the portable handset sets the portable handset to the general mobile handset for communications or the RFID reader. The user can make such setting by manipulating a button provided on the portable handset or by using the options displayed on the portable handset. If the portable handset is set for mobile communications, the portable handset performs operations for the mobile communications, and, if the portable handset serves as the RFID reader, the portable handset performs operations of the RFID reader.

The antenna 560 transmits and receives data and electromagnetic waves, and the directional coupler 550 sets the portable handset to the mobile handset for communications or the RFID reader. If the directional coupler 550 is used for the mobile communications, the band select filter (BSF) 518 to the mixer 500 and the mixer 520 to the band select filter (BSF) 544 perform the operations for mobile communications. If the directional coupler 550 is used as the RFID reader, the band select filter 518 to the mixer 500 and the mixer 520 to the band select filter 544 serve as the RFID reader. The same description as above is applied to the operations of the band select filter 518 to the mixer 500 and the mixer 520 to the band select filter 544.

The description has been made so far on the operations performed in case that the frequency used for mobile communications is identical to the frequency used for the RFID reader. However, the portable handset can be used even in cases where the frequency used for the mobile communications is not identical to the frequency used for the RFID reader. In this case, the band select filter 518 to the mixer 500 and the mixer 520 to the band select filter 544 can operate differently. In general, the frequencies used for the RFID reader are different from those used for the mobile communications. Table 1 as below shows the frequencies used for the RFID reader and the frequencies used for the mobile communications.

TABLE 1

| | Frequencies used |
|---|---|
| RFID reader | 850 MHz to 920 MHz or 2.4 GHz to 2.45 GHz |
| GSM | 850 MHz to 900 MHz or 1800 MHz to 1900 MHz |
| CDMA | 1850 MHz to 1910 MHz or 1930 MHz to 1990 MHz |
| | 824 MHz to 849 MHz or 869 MHz to 894 MHz |
| W-CDMA | 1920 MHz to 1980 MHz or 2110 MHz to 2179 MHz |

As shown in Table 1 as above, the frequencies used for the RFID reader are slightly different from those used for the mobile communications. Thus, if the portable handset of a single structure is used for the RFID reader and for general mobile communications, the structure has to operate differently for the two different functions. That is, different frequencies have to be generated from the local oscillators, filtered in various filters, and so on. The control signal controls the frequencies generated from the local oscillators and the frequencies filtered in the various filters.

Figure 2:
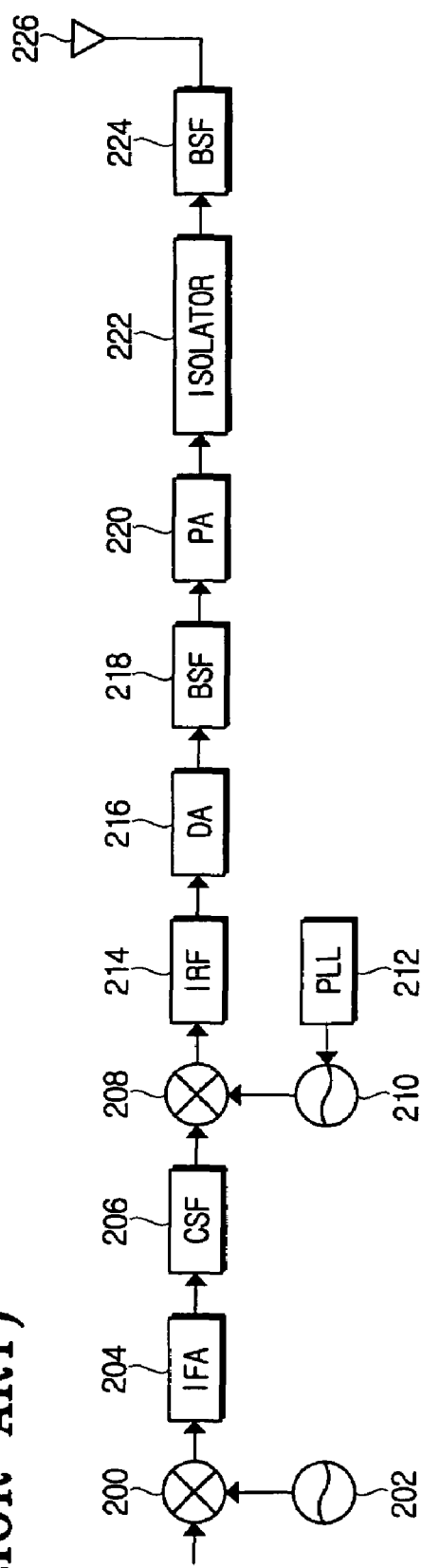
FIG. 2 is a view for showing a structure of a signal transmission part of a portable handset.
Figure 6:
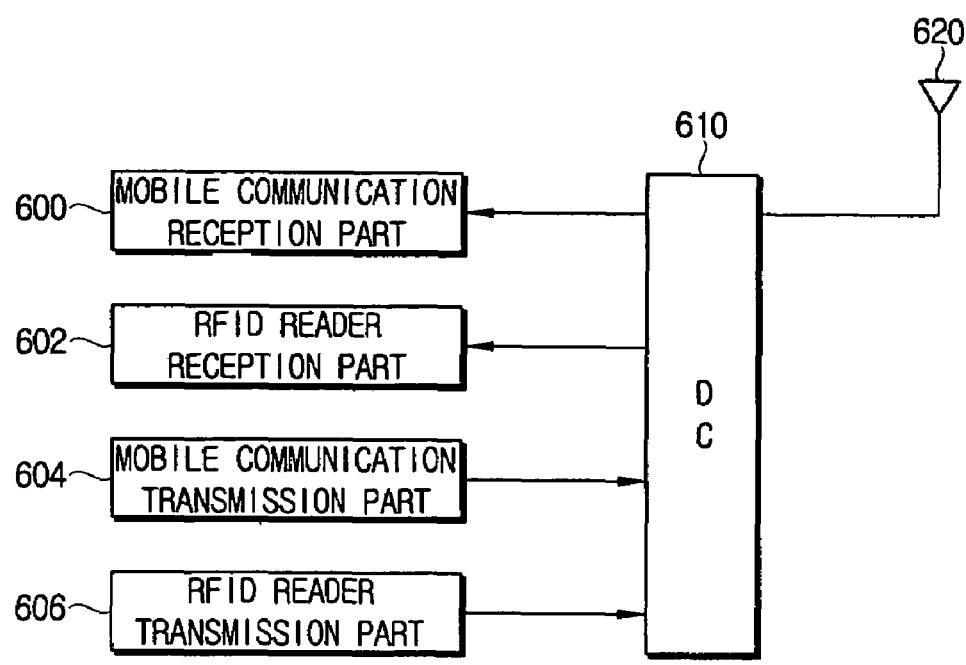
FIG. 6 is a view for showing a structure of a signal reception/transmission part of a portable handset according to an exemplary embodiment of the present invention.

FIG. 6 is a view for showing a structure of a portable handset performing a function for mobile communications and a function for the RFID reader according to an exemplary embodiment of the present invention. In FIG. 6, the portable handset has a structure for carrying out the mobile communications and a structure carrying out a function for performing a function for the RFID reader, unlike those shown in FIG. 5. The structure performing the mobile communications has a mobile communication reception part 600 and a mobile communication transmission part 604, and the structure performing the function for the RFID reader also has an RFID reader reception part 602 and an RFID reader transmission part 606. The mobile communication reception part 600 and the RFID reader reception part 602 consist of the band select filter 518 to the mixer 500, and the mobile communication transmission part 604 and the RFID reader transmission part 606 consists of the mixer 520 to the band select filter 544. The descriptions on FIG. 1 and FIG. 2 can be applied to the operations that the band select filter 518 to the mixer 500 and the mixer 520 to the band select filter 544 carry out.

The user of the portable handset sets the portable handset to a device for general mobile communications or an RFID reader. The user can set the portable handset as above by manipulating a button provided on the portable set or by using options displayed on the portable handset. If the portable handset is set for the mobile communications, the portable handset carries out operations for the mobile communications, and, if the portable handset is set for the RFID reader, the portable handset carries out operations for the RFID reader. If the portable handset is used for the mobile communications, the directional coupler 610 is connected to the mobile communication reception part 600 and the mobile communication transmission part 604, and, if the portable handset is used for the RFID reader, the directional coupler 610 is connected to the RFID reader reception part 602 and the RFID reader transmission part 606. In FIG. 6, the structure has a disadvantage of increasing the volume of the portable handset, but has an advantage of enabling the operations to be rapidly set for the structure of the RFID reader reception part 602 and the structure for the RFID reader transmission part 606.

As stated above, the portable handset according to the present invention serves as the RFID reader enabling a built-in RFID chip to obtain information on business cards, posts, items, and so on. Further, if information is additionally required about the business cards, posts, and items, the portable handset connects to a server storing the information on the business cards, posts, and items, so that the user of the portable handset can obtain the desired information at any time.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of using a portable handset, the method comprising:
    receiving information on an item by use of electromagnetic waves propagating from the item in which a radio frequency identification (RFID) chip is embedded, comprising:
        requesting, by a portable handset and from the item, the information on the item that is stored in the RFID chip; and
        receiving, from the item, the information on the item; and
    receiving electromagnetic waves generated from an RFID reader, and sending response information providing information concerning data stored in the portable handset.

2. The method as claimed in claim 1, further comprising, if additional information is needed other than the received information, requesting the additional information from a server storing the information on the item by the portable handset using the received information.

3. The method as claimed in claim 2, wherein the information received from the item is stored in a predetermined storage unit to be read out when needed.

4. The method as claimed in claim 1, wherein a range of frequencies of the electromagnetic waves used for RFID is identical to that used for mobile communications.

5. The method as claimed in claim 4, wherein a single structure of the portable handset carries out operations for the RFID and operations for the mobile communications.

6. The method as claimed in claim 5, wherein the portable handset carries out the operations for the RFID or the operations for the mobile communications according to a signal sent according to activation of an input button provided on the portable handset.

7. The method as claimed in claim 4, wherein a structure only for the operations for the RFID is included in the portable handset.

8. The method as claimed in claim 7, wherein the portable handset carries out the operations for the RFID or the operations for the mobile communications according to a signal sent according to activation of an input button provided on the portable handset.

9. The method as claimed in claim 1, wherein frequencies of the electromagnetic waves used for RFID is the same as a predetermined range of frequencies used for mobile communications.

10. The method as claimed in claim 9, wherein a single structure of the portable handset carries out operations for the RFID and operations for the mobile communications.

11. The method as claimed in claim 10, wherein the portable handset carries out the operations for the RFID or the operations for the mobile communications according to a signal sent according to activation of an input button provided on the portable handset.

12. The method as claimed in claim 9, wherein a structure only for the operations for the RFID is included in the portable handset.

13. The method as claimed in claim 12, wherein the portable handset carries out the operations for the RFID or the operations for the mobile communications according to a signal sent according to activation of an input button provided on the portable handset.

14. A system for receiving information on an item, comprising:
   a radio frequency identification (RFID) chip embedded in the item, the RFID chip emitting electromagnetic waves; and
   a portable handset requesting information stored in the RFID chip-embedded item and receiving the requested information,
   wherein the RFID chip sends the information stored therein upon the request and
   wherein the portable handset further comprises an RFID transponder adapted to receive electromagnetic waves generated from an RFID reader, and to send response information providing information concerning data stored in the portable handset.

15. The system as claimed in claim 14, wherein if additional information is needed other than the received information, the portable handset requests, using the received information, the additional information from a server storing the information on the item.

16. The system as claimed in claim 15, wherein the portable handset has a predetermined storage unit for storing the information received from the item in order to read the information when necessary.

17. The system as claimed in claim 14, wherein the portable handset sets a range of frequencies used for the RFID to be identical to that used for mobile communications.

18. The system as claimed in claim 17, wherein the portable handset is in a single structure carrying out operations for the RFID and operations for the mobile communications.

19. The system as claimed in claim 18, wherein the portable handset carries out the operations for the RFID or the operations for the mobile communications according to a signal sent according to activation of an input button provided on the portable handset.

20. The system as claimed in claim 17, wherein the portable handset has a structure only for the operations for the RFID.

21. The system as claimed in claim 20, wherein the portable handset carries out the operations for the RFID or the operations for the mobile communications according to a signal sent according to activation of an input button provided on the portable handset.

22. The system as claimed in claim 14, wherein the portable handset sets frequencies of a predetermined range of frequencies used for mobile communications to frequencies used for the RFID.

23. The system as claimed in claim 22, wherein the portable handset is in a single structure carrying out operations for the RFID and operations for the mobile communications.

24. The system as claimed in claim 23, wherein the portable handset carries out the operations for the RFID or the operations for the mobile communications according to a signal sent according to activation of an input button provided on the portable handset.

25. The system as claimed in claim 22, wherein the portable handset has a structure only for the operations for the RFID.

26. The system as claimed in claim 25, wherein the portable handset carries out the operations for the RFID or the operations for the mobile communications according to a signal sent according to activation of an input button provided on the portable handset.

* * * * *